(12) United States Patent
Hamada

(10) Patent No.: US 9,370,761 B2
(45) Date of Patent: Jun. 21, 2016

(54) MICROREACTOR

(71) Applicant: IHI Corporation, Tokyo (JP)

(72) Inventor: Koki Hamada, Tokyo (JP)

(73) Assignee: IHI Corporation, Tokyo (JP)

( * ) Notice: Subject to any disclaimer, the term of this patent is extended or adjusted under 35 U.S.C. 154(b) by 0 days.

(21) Appl. No.: 14/556,264

(22) Filed: Dec. 1, 2014

(65) Prior Publication Data

US 2015/0086439 A1  Mar. 26, 2015

Related U.S. Application Data

(63) Continuation of application No. PCT/JP2013/060591, filed on Apr. 8, 2013.

(30) Foreign Application Priority Data

Jun. 7, 2012  (JP) .................................. 2012-129627

(51) Int. Cl.
| | |
|---|---|
| B01J 19/00 | (2006.01) |
| F28D 7/00 | (2006.01) |
| F28F 13/08 | (2006.01) |
| H01M 8/22 | (2006.01) |
| H01M 8/04 | (2016.01) |
| F28D 21/00 | (2006.01) |

(52) U.S. Cl.
CPC ........... *B01J 19/0093* (2013.01); *F28D 7/0008* (2013.01); *F28F 13/08* (2013.01); *H01M 8/04029* (2013.01); *H01M 8/22* (2013.01); *B01J 2219/00786* (2013.01); *B01J 2219/00792* (2013.01); *B01J 2219/00835* (2013.01); *B01J 2219/00873* (2013.01); *B01J 2219/00896* (2013.01); *F28D 2021/0022* (2013.01); *Y02E 60/50* (2013.01)

(58) Field of Classification Search
CPC ............. B01J 2219/00786; B01J 2219/00835; B01J 2219/0086; B01J 2219/00873; F28F 13/08; F28D 7/0008; F28D 7/0025; F28D 2021/0022
See application file for complete search history.

(56) References Cited

U.S. PATENT DOCUMENTS

| | | | |
|---|---|---|---|
| 2003/0219903 A1* | 11/2003 | Wang ................... | B01J 19/0093 436/37 |
| 2007/0074773 A1 | 4/2007 | Shiraishi et al. | |
| 2011/0038758 A1 | 2/2011 | Akaba et al. | |

FOREIGN PATENT DOCUMENTS

| | | |
|---|---|---|
| EP | 0 798 798 A2 | 10/1997 |
| JP | S57-132971 U | 8/1982 |
| JP | S57-192798 A | 11/1982 |

(Continued)

OTHER PUBLICATIONS

European Patent Office, "Extended European Search Report," issued in European Patent Application No. 13 801 194.5, which is a European counterpart of U.S. Appl. No. 14/556,264, with an issuance date of Feb. 9, 2016, 6 pages.

*Primary Examiner* — Lessanework Seifu

(57) ABSTRACT

A microreactor includes: a reaction passage to flow a fluid as a reaction object; and a medium passage provided in parallel with the reaction passage to flow a heat medium to exchange heat with the fluid in the reaction passage. A cross-sectional area of the medium passage adjacent to a location of the reaction passage where any of heat generation and heat absorption associated with a reaction of the fluid is relatively large is smaller than a cross-sectional area of the medium passage adjacent to a location of the reaction passage where any of the heat generation and the heat absorption associated with the reaction of the fluid is relatively small.

8 Claims, 2 Drawing Sheets

(56) References Cited

FOREIGN PATENT DOCUMENTS

| JP | 2005-036671 A | 2/2005 |
| JP | 3900570 B2 | 4/2007 |
| WO | 92/09848 A1 | 6/1992 |
| WO | 2006/054689 A1 | 5/2006 |

* cited by examiner

MICROREACTOR

CROSS REFERENCE TO RELATED APPLICATIONS

This application is a continuation application of International Application No PCT/JP2013/060591, filed on Apr. 8, 2013, which claims priority to Japanese Patent Application No. 2012-129627, filed on Jun. 7, 2012, the entire contents of which are incorporated by references herein

FIELD OF THE INVENTION

The present invention relates to a microreactor designed to use a micro space as a reaction field.

DESCRIPTION OF THE RELATED ART

A microreactor is a reaction apparatus provided with a micro space as a reaction field, and designed to increase a collision frequency of molecules and a heat transfer velocity, thereby improving a reaction rate and a reaction yield.

Such a microreactor includes a reaction passage with a small cross section, for example. A catalyst is provided inside the reaction passage. When a fluid which is a reaction object flows in the reaction passage, a reaction of the fluid is accelerated. The microreactor further includes a medium passage provided in parallel with the reaction passage and in thermal contact with the reaction passage. A heat medium flows in the medium passage. Accordingly, the heat generated by the reaction is collected through the heat medium in the medium passage.

Japanese Patent No. 3900570 discloses a technique to cause a cooling gas to flow in a medium passage provided in contact with a reaction passage and thereby to efficiently cool a reformed gas flowing in the reaction passage. In addition, according to the technique of the aforementioned patent document, cooling efficiency is made different between an inlet and an outlet of the reaction passage by way of filling a heat transfer accelerator only into a region of the medium passage corresponding to the outlet of the reaction passage.

SUMMARY OF THE INVENTION

Depending on a temperature transition in a reaction passage during an exothermic reaction, the conventional microreactor may cause a bias in the temperature distribution, thereby necessitating a temperature control measure or otherwise adversely affecting durability of the microreactor. This is because the heat absorption capacity of the heat medium is underused at a portion of the medium passage adjacent to a location where heat generation is low, whereas the heat medium causes an excessive temperature rise attributed to a failure to sufficiently absorb the heat at a portion of the medium passage adjacent to a location where heat generation is high.

On the other hand, during an endothermic reaction, the heat transfer capacity of the heat medium is underused at a portion of the medium passage adjacent to a location where heat absorption is low, whereas the heat medium is likely to hinder the efficient progress of the endothermic reaction attributed to a failure to sufficiently transfer the heat at a portion of the medium passage adjacent to a location where heat absorption is high.

In view of the aforementioned problems, an object of the present invention is to provide a microreactor capable of appropriately balancing heat generation or heat absorption in a reaction passage, and improving efficiency in heat exchange between a heat medium and a fluid as a reaction object.

An aspect of the present invention is a microreactor. Its gist is as follows. The microreactor includes: a reaction passage configured to flow a fluid as a reaction object; and a medium passage provided in parallel with the reaction passage and configured to flow a heat medium to exchange heat with the fluid in the reaction passage. A cross-sectional area of the medium passage adjacent to a high-activity region of the reaction passage is smaller than a cross-sectional area of the medium passage adjacent to a low-activity region of the reaction passage. Any of heat generation and heat absorption associated with a reaction of the fluid is relatively large in the high-activity region. Any of the heat generation and the heat absorption associated with the reaction of the fluid is relatively small in the low-activity region.

The medium passage may be formed in such a way that its cross-sectional area gradually increases from the high-activity region side of the reaction passage toward the low-activity region side of the reaction passage.

An opening area of the medium passage close to the high-activity region of the reaction passage may be smaller than an opening area of the medium passage close to the low-activity region of the reaction passage.

A cross-sectional area of the high-activity region of the reaction passage may be larger than a cross-sectional area of the low-activity region of the reaction passage.

The reaction passage may be formed in such a way that its cross-sectional area gradually decreases from the high-activity region side toward the low-activity region side.

An opening area of the reaction passage close to the high-activity region may be larger than an opening area of the reaction passage close to the low-activity region.

The reaction passage may include a catalyst layer provided at least on part of its inner wall included in the high-activity region and the low-activity region. The thickness of the catalyst layer in the high-activity region may be larger than a thickness of the catalyst layer in the low-activity region.

A flowing direction of the heat medium in the medium passage and a flowing direction of the fluid in the reaction passage may be opposed to each other.

According to the present invention, it is possible to provide a microreactor capable of appropriately balancing heat generation or heat absorption in a reaction passage, and improving efficiency in heat exchange between a heat medium and a fluid as a reaction object

DESCRIPTION OF THE PREFERRED EMBODIMENTS

Preferred embodiments of the present invention will be described below in detail with reference to the accompanying drawings. Dimensions, materials, specific numerical values, and the like shown in the embodiments are mere examples for facilitating the understanding of the invention, and are not intended to limit the invention unless specifically stated otherwise. Meanwhile, in the specification and the drawings, elements having substantially the same functions or configurations will be denoted by the same reference signs to omit duplicated explanations. Moreover, illustration of elements not directly related to the present invention will be omitted.
(First Embodiment: Microreactor 100)

A microreactor 100 includes micro-channel passages as a reaction field. The micro-channel passages include multiple pipes (tubes) formed by microfabrication. Accordingly, a reaction rate and a reaction yield of a fluid flowing in the pipes can be improved. In addition, it is possible to achieve rapid mixing, active concentration distribution arrangement, and the like by optionally configuring convection and diffusion aspects, and thus to achieve strict control of reaction conditions.

Figure 1:
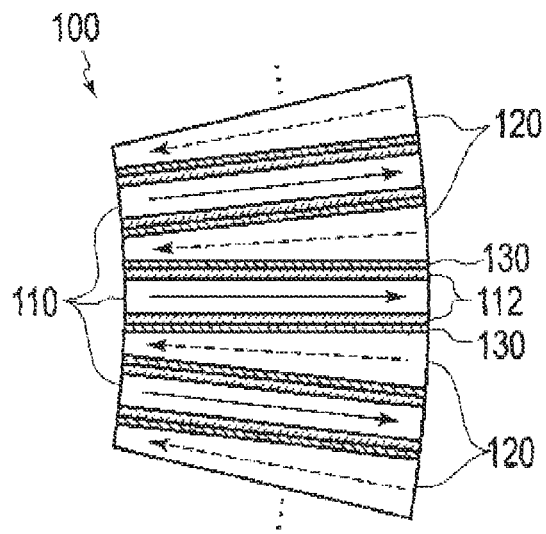
FIG. 1 is a transverse sectional view showing a schematic configuration of a microreactor according to a first embodiment of the present invention.

FIG. 1 is a transverse sectional view showing a schematic configuration of the microreactor 100. The microreactor 100 includes reaction passages 110 and medium passages 120. Each reaction passage 110 is a minute pipe (tube) with a rectangular cross section, which flows a fluid (a gas or a liquid, hereinafter simply referred to as the fluid) as a reaction object in a direction indicated with a solid-line arrow in FIG. 1. The reaction passage 110 of the embodiment has the rectangular cross section, at least one side out of the width and the height of which is equal to or below 1 mm. It is to be noted, however, that this value does not limit the shape and dimensions of the reaction passages 110. As in the case of the reaction passages 110, each medium passage 120 is also a minute pipe (tube) with a rectangular cross section. The medium passage 120 flows a heat medium in a direction indicated with a dashed-line arrow in FIG. 1. The medium passage 120 of the embodiment has the rectangular cross section, at least one side out of the width and the height of which is equal to or below 1 mm. It is to be noted, however, that this value does not limit the shape and dimensions of the medium passages 120. Each reaction passage 110 and the corresponding medium passage 120 are formed in parallel with each other while interposing a heat transfer wall 130 in between so as to enable heat exchange between the fluid and the heat medium respectively flowing therein. Note that the flowing direction of the reaction fluid and the flowing direction of the heat medium are opposed to each other. The disposition of the reaction passage 110 and the medium passage 120 in parallel with each other as described above makes it possible to cause the heat medium to rapidly absorb heat associated with an exothermic reaction of the fluid, and to accelerate an endothermic reaction of the fluid by allowing rapid heat transfer from the heat medium.

Meanwhile, each reaction passage 110 includes a catalyst layer 112 which is provided on at least part of its inner wall, or preferably on the entire inner wall. The catalyst layer 112 accelerates reactions of the fluid. When the catalyst layer 112 is provided on part of the inner wall, that part includes a high-activity region and a low-activity region of the reaction passage 110. Here, the high-activity region means a portion (a region) where heat generation or heat absorption associated with a reaction of the fluid is relatively high while the low-activity region means a portion (a region) where the heat generation or the heat absorption associated with a reaction of the fluid is relatively low. When a heat transfer wall distance of the reaction passage 110 is in a range from 200 μm to 6 mm (exclusive of the catalyst layer 112), for example, a thickness of the catalyst layer 112 is equal to or above 50 μm. Now, operation of the embodiment will be described below on the basis of the exothermic reaction and the endothermic reaction, respectively.

Figure 2A:
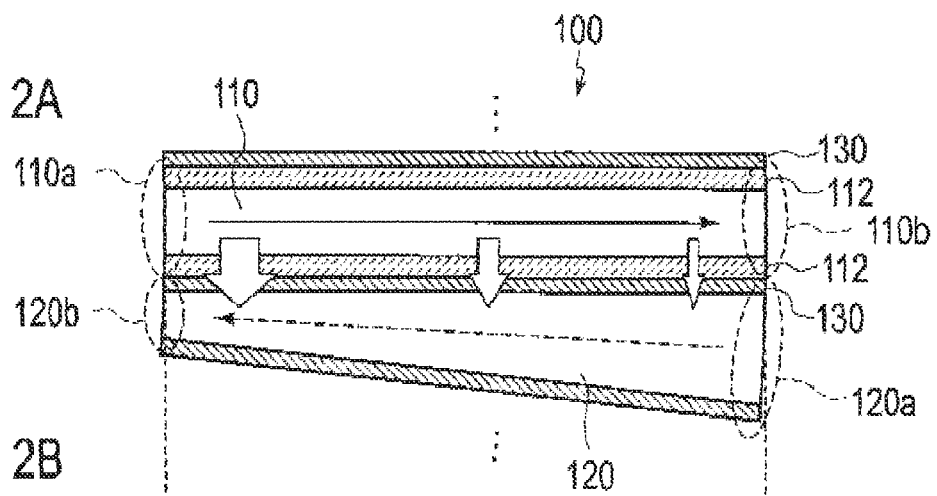
FIGS. 2A and 2B are diagrams for explaining an exothermic reaction in a reaction passage.
Figure 2B:
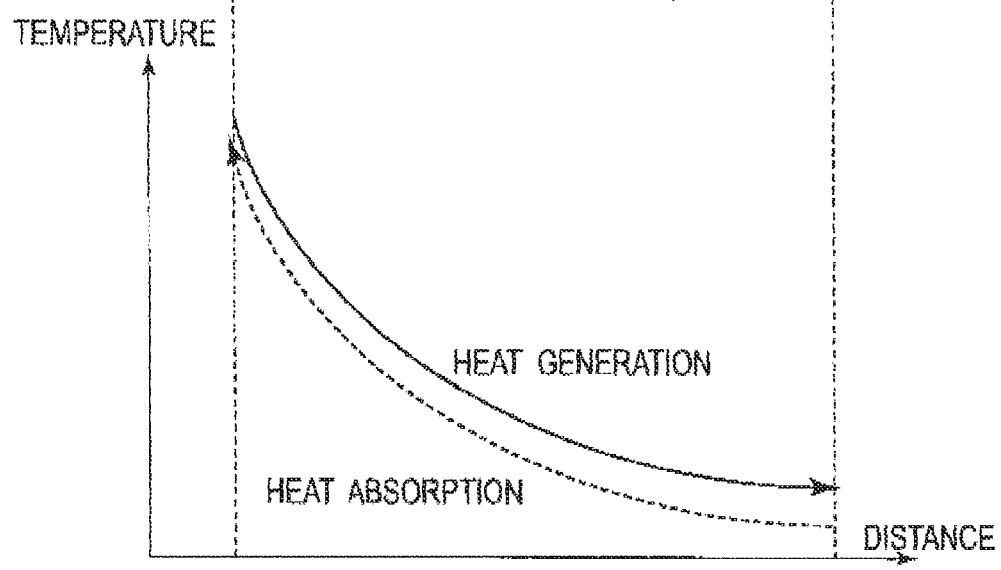

FIGS. 2A and 2B show explanatory diagrams for explaining the exothermic reaction in the reaction passage 110. FIG. 2A depicts a combination of the reaction passage 110 and the medium passage 120 adjacent to each other, while FIG. 2B depicts temperature gradients in the respective passages.

Referring to FIG. 2A, the fluid flows inside the reaction passage 110 and comes into contact with the catalyst layer 112, thereby initiating the exothermic reaction. Examples of the exothermic reaction include the following reactions expressed by Chemical Formula 1 and Chemical Formula 2.

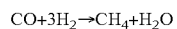  (Chemical Formula 1)

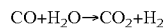  (Chemical Formula 2)

Here, a catalyst such as Ni-supported $Al_2O_3$ or Ru-supported $Al_2O_3$ is used as the catalyst layer 112 in the exothermic reaction according to Chemical Formula 1. Meanwhile, a Cu—Zn based catalyst or a Fe—Cr based catalyst is used as the catalyst layer 112 in the exothermic reaction according to Chemical Formula 2.

At this time, as indicated with a solid line in FIG. 2B, a temperature transition in the reaction passage 110 shows an aspect in which the temperature becomes the highest in the vicinity of an inlet (an opening 110a) of the reaction passage 110 and the lowest in the vicinity of an outlet (an opening 110b) thereof. This aspect is due to the fact that the fluid soon after flowing into the reaction passage 110 still contains a large amount of an unreacted substance which increases a reaction frequency; and as the reaction progresses along the flow of the fluid inside the reaction passage 110, most of the substance will have reacted and the reaction frequency will therefore decrease when the fluid is about to flow out of the reaction passage 110.

Accordingly, the heat generation becomes relatively large in the vicinity of the inlet of the reaction passage 110 where the reaction frequency is high, whereas the heat generation becomes relatively small in the vicinity of the outlet thereof. The heat thus generated is transferred to the medium passage 120 as indicated with white arrows in FIG. 2A. Note that the width of each of the white arrows in FIG. 2A represents the amount of heat transfer. Here, if the medium passage 120 is simply formed to have the constant passage cross section, the heat absorption capacity of the heat medium is underused at a portion of the medium passage 120 adjacent to a location (i.e., the low-activity region) of the reaction passage 110 where reaction heat is low. On the other hand, the heat medium cannot completely absorb a rise in temperature at a portion of the medium passage 120 adjacent to a location (i.e., the high-activity region) of the reaction passage 110 where the reaction heat is high, and an excessive temperature rise occurs in the reaction passage 110 as a consequence. In this regard, according to the embodiment, a work transition of the heat absorption of the medium passage 120 is changed in response to the temperature transition in the reaction passage 110, thereby achieving a heat balance.

To be more precise, in the microreactor 100 of the embodiment, the medium passage 120 is formed in such a way that its cross-sectional area gradually increases from the portion corresponding to the high-activity region of the reaction passage 110 toward the portion corresponding to the low-activity region of the reaction passage 110 (from the opening 110a toward the opening 110b). In other words, the pathway of the medium passage 120 gradually narrows from an inlet an opening 120a) toward an outlet (an opening 120b) for the heat medium.

Since the medium passage 120 has the above-described shape, a flow velocity of the heat medium inside the medium passage 120 becomes progressively faster from the opening 120a toward the opening 120b when its flow rate per unit time is constant. Accordingly, a frequency (a heat transfer coefficient) of contact between the heat medium with a high heat transfer capacity and an inner surface of the medium passage 120 increases at the portion of the medium passage 120 corresponding to the high-activity region of the reaction passage 110, and efficient heat exchange is achieved as indicated with a dashed line in FIG. 2B. As a consequence, it is possible to avoid the excessive temperature rise in the microreactor 100 due to a failure of the heat medium to sufficiently absorb the heat.

On the other hand, a cross section of the medium passage 120 corresponding to the low-activity region of the reaction passage 110 is wider than a cross section of the medium passage 120 corresponding to the high-activity region of the reaction passage 110. Accordingly, the flow velocity of the heat medium at the portion of the medium passage 120 corresponding to the low-activity region becomes lower than the flow velocity of the heat medium at the portion of the medium passage 120 corresponding to the high-activity region. However, the low flow velocity is not a problem because the heat absorption capacity of the heat medium is underused and a large quantity of heat absorption is therefore not required at the portion of the medium passage 120 corresponding to the low-activity region.

Figure 3A:
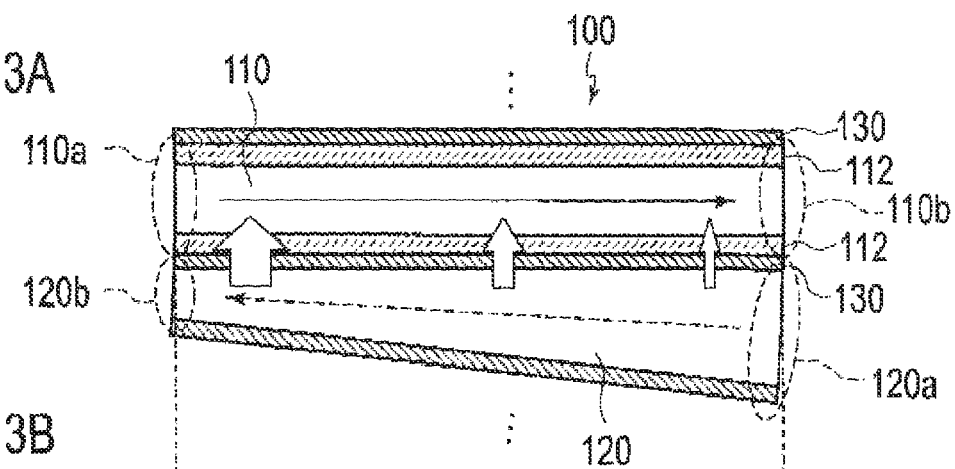
FIGS. 3A and 3B are diagrams for explaining an endothermic reaction in the reaction passage.
Figure 3B:
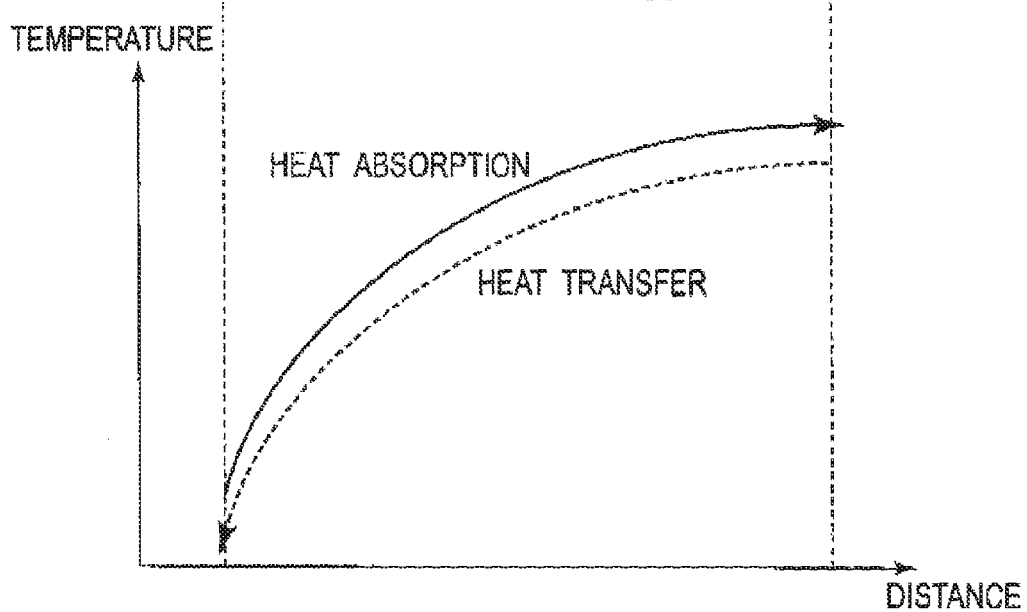

FIGS. 3A and 3B show explanatory diagrams for explaining the endothermic reaction in the reaction passage 110. FIG. 3A depicts the combination of the reaction passage 110 and the medium passage 120 adjacent to each other, while FIG. 3B depicts temperature gradients in the respective passages.

Referring to FIG. 3A, the fluid flows inside the reaction passage 110 and comes into contact with the catalyst layer 112, thereby initiating the endothermic reaction. Examples of the endothermic reaction include the following reaction expressed by Chemical Formula 3.

$$CH_4 + H_2O \rightarrow CO + 3H_2 \quad \text{(Chemical Formula 3)}$$

Here, the catalyst such as Ni-supported $Al_2O_3$ or Ru-supported $Al_2O_3$ is used as the catalyst layer 112 in the endothermic reaction according to Chemical Formula 3.

At this time, as indicated with a solid line in FIG. 3B, a temperature transition in the reaction passage 110 increases with the advance in the flowing direction, and its temperature gradient (a rise in temperature per unit moving distance) becomes the highest in the vicinity of the inlet (the opening 110a) of the reaction passage 110 and the lowest in the vicinity of the outlet (the opening 110b) thereof. As in the case of the exothermic reaction, this aspect is due to the fact that: the fluid soon after flowing into the reaction passage 110 still contains a large amount of an unreacted substance which increases a reaction frequency; and as the reaction progresses along the flow of the fluid inside the reaction passage 110, most of the substance will have reacted and the reaction frequency will therefore decreases when the fluid is about to flow out of the reaction passage 110.

Accordingly, a relatively large amount of heat transfer is required for heat absorption in the vicinity of the inlet of the reaction passage 110 where the reaction frequency is high, whereas a relatively small amount of heat transfer is required in the vicinity of the outlet thereof. Accordingly, the heat of the heat medium is transferred to the reaction passage 110 as indicated with white arrows in FIG. 3A. Note that the width of each of the white arrows in FIG. 3A represents the amount of heat transfer. In this case as well, a work transition of the heat transfer of the medium passage 120 is changed in response to the temperature transition in the reaction passage 110, thereby achieving a heat balance.

In the endothermic reaction as well, the medium passage 120 is formed in such a way that, as in the case of the exothermic reaction, its cross-sectional area gradually increases from the portion corresponding to the region of the reaction passage 110 where the heat absorption is relatively large toward the portion corresponding to the region thereof where the heat absorption is relatively small (from the opening 110a toward the opening 110b). In other words, the medium passage 120 is formed in such a way that its cross-sectional area gradually increases from the portion on the high-activity region side of the reaction passage 110 toward the portion on the low-activity region side of the reaction passage 110. That is to say, the pathway of the medium passage 120 gradually narrows from the inlet (the opening 120a) toward the outlet (the opening 120b) for the heat medium.

Since the medium passage 120 has the above-described shape, the flow velocity of the heat medium inside the medium passage 120 becomes progressively faster from the opening 120a toward the opening 120b when its flow rate per unit time is constant. Accordingly, the frequency (the heat transfer coefficient) of contact between the heat medium and the inner surface of the medium passage 120 increases at the portion of the medium passage 120 corresponding to the high-activity region of the reaction passage 110, and efficient heat exchange is achieved as indicated with a dashed line in FIG. 3B. Specifically, the heat medium that has undergone the heat absorption rapidly moves at this portion and a new heat medium flows therein. Accordingly, it is possible to prevent the temperature of the microreactor 100 from dropping locally and excessively as a result of the heat medium discharging (being deprived of) too much heat.

In the above-described embodiment, the medium passage 120 is formed in such a way that its cross-sectional area gradually increases. However, the change in the cross-sectional area is not limited only to the gradual increase. Specifically, the cross-sectional area of the portion of the medium passage 120 adjacent to the high-activity region of the reaction passage 110 may be set smaller than the cross-sectional area of the portion of the medium passage 120 adjacent to the low-activity region of the reaction passage 110. In other words, the object of the embodiment can be attained only by narrowing the portion of the medium passage 120 corresponding to the low-activity region of the reaction passage 110.

As shown in FIGS. 2A to 3B, the opening area (the outlet area) of the opening 120b of the medium passage 120 close to the high-activity region on the high-activity region side) becomes smaller than the opening area (the inlet area) of the opening 120a of the medium passage 120 close to the low-activity region (on the low-activity region side) as a consequence of the above-described conditions.

(Second Embodiment: Microreactor 200)

In the above-described first embodiment, the size of the cross-sectional area is changed in the flowing direction in terms of the medium passage 120. In the second embodiment, the size of the cross-sectional area is changed in the flowing direction in terms of not only the medium passage 120 but also the reaction passage 110.

Figure 4:
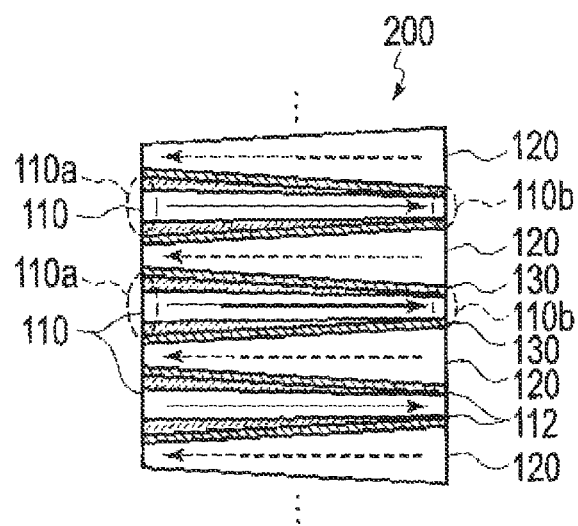
FIG. 4 is a transverse sectional view showing a schematic configuration of a microreactor according to a second embodiment of the present invention.

FIG. 4 is a transverse sectional view showing a schematic configuration of a microreactor 200. As in the case of the microreactor 100 in the first embodiment, the microreactor 200 includes reaction passages 110 and medium passages 120. Each reaction passage 110 and the corresponding medium passage 120 are formed in parallel with each other while interposing a heat transfer wall 130 in between so as to enable heat exchange between a fluid and a heat medium respectively flowing therein. However, unlike in the first embodiment, the reaction passage 110 is formed in such a way that its cross-sectional area gradually decreases from a portion where heat generation or heat absorption is relatively large toward a portion where heat generation or heat absorption is relatively small (from an opening 110a toward an opening 110b) In other words, the reaction passage 110 is formed in such a way that its cross-sectional area gradually decreases from a high-activity region side to a low-activity region side.

Since the reaction passage 110 has the above-described shape, a thickness of a portion of a catalyst layer 112 in the high-activity region of the reaction passage 110 can be set larger than a thickness of a portion of the catalyst layer 112 in the low-activity region thereof. In the meantime, it is possible to further accelerate the reaction without increasing a flow velocity of the fluid.

Here, the catalyst layer 112 is provided on an inner wall of each reaction passage 110 while a hollow without any catalyst layer 112 is defined along the center axis of the reaction passage 110. Instead, a catalyst may be filled in the reaction passage 110. In this case as well, it is possible to increase the absolute amount of the catalyst in the high-activity region so that the reaction can be accelerated further.

Meanwhile, in the above-described embodiment, the reaction passage 110 is formed in such a way that its cross-sectional area gradually decreases. However, the change in the cross-sectional area is not limited only to the gradual decrease. Specifically, the cross-sectional area of the high-activity region of the reaction passage 110 may be set larger than the cross-sectional area of the low-activity region of the reaction passage 110. In other words, the object of the embodiment can be attained only by widening the portion of the reaction passage 110 where heat generation or heat absorption is large.

As shown in FIG. 4, the opening area (the inlet area) of the opening 110a close to the high-activity region (on the high-activity region side) becomes larger than the opening area (the outlet area) of the opening 110b close to the low-activity region (on the low-activity region side) as a consequence of the above-described conditions.

As described above, in the embodiment, the flowing direction of the heat medium in the medium passage 120 and the flowing direction of the fluid in the reaction passage 110 are opposed to each other. Accordingly, the portion of the reaction passage 110 with the large cross-sectional area corresponds to the portion of the medium passage 120 with the small cross-sectional area, while the portion of the reaction passage 110 with the small cross-sectional area corresponds to the portion of the medium passage 120 with the large cross-sectional area. As a consequence, a layout balance is achieved as shown in FIG. 4 so that the passages can be provided in parallel with one another. For this reason, this configuration is advantageous to installation of the microreactor 200 and to connection of the openings of the passages to other devices.

As described above, according to the embodiment, it is possible to appropriately balance heat generation or heat absorption in the reaction passage, and to improve efficiency of heat exchange between the heat medium and the fluid as the reaction object.

Although the embodiments of the present invention have been described above with reference to the accompanying drawings, the present invention is not limited only to the embodiments. It is obvious that a person skilled in the art can arrive at various altered examples and modified examples within the scope as defined in the appended claims. Here, it is to be understood that such alterations and modifications are naturally encompassed by the technical scope of the present invention as well.

For instance, while the above-described embodiments explain the examples of gradually increasing or gradually decreasing the cross-sectional areas of the passages, the transition of the cross-sectional area does not always have to be continuous. The reaction passage 110 only has to satisfy that its portion where heat generation or heat absorption associated with a reaction is relatively high corresponds to the portion of the medium passage 120 with the relatively small cross-sectional area, and that its portion where heat generation or heat absorption associated with the reaction is relatively low corresponds to the portion of the medium passage 120 with the relatively large cross-sectional area.

What is claimed is:

1. A microreactor comprising:
   a reaction passage configured to flow a fluid as a reaction object; and
   a medium passage provided in parallel with the reaction passage and configured to flow a heat medium to exchange heat with the fluid in the reaction passage, wherein
   the reaction passage includes a catalyst layer provided at least on part of an inner wall of the reaction passage, the catalyst layer forming a high-activity region and a low-activity region in the reaction passage,
   a cross-sectional area of the medium passage adjacent to the high-activity region of the reaction passage is smaller than a cross-sectional area of the medium passage adjacent to the low-activity region of the reaction passage,
   any of heat generation and heat absorption associated with a reaction of the fluid in the high-activity region is larger than that in the low-activity region,
   a cross-sectional area of the high-activity region of the reaction passage is larger than a cross-sectional area of the low-activity region of the reaction passage, and
   a thickness of the catalyst layer in the high-activity region is larger than a thickness of the catalyst layer in the low-activity region.

2. The microreactor according to claim 1, wherein the medium passage is formed in such a way that a cross-sectional area of the medium passage gradually increases from the high-activity region side of the reaction passage toward the low-activity region side of the reaction passage.

3. The microreactor according to claim 1, wherein the medium passage includes a first opening located on a side of the high-activity region of the reaction passage and a second opening located on a side of the low-activity region of the reaction passage, and an opening area of the first opening of the medium passage is smaller than an opening area of the second opening of the medium passage.

4. The microreactor according to claim 2, wherein the medium passage includes a first opening located on a side of the high-activity region of the reaction passage and a second opening located on a side of the low-activity region of the reaction passage, and an opening area of the first opening of the medium passage is smaller than an opening area of the second opening of the medium passage.

5. The microreactor according to claim 1, wherein the reaction passage is formed in such a way that a cross-sectional area of the reaction passage, gradually decreases from the high-activity region side toward the low-activity region side.

6. The microreactor according to claim 1, wherein the reaction passage includes a first opening located on a side of the high-activity region thereof and a second opening located on a side of the low-activity region thereof, and an opening area of the first opening of the reaction passage is larger than an opening area of the second opening of the reaction passage.

7. The microreactor according to claim 5, wherein the reaction passage includes a first opening located on a side of the high-activity region thereof and a second opening located on a side of the low-activity region thereof, and an opening area of the first opening of the reaction passage is larger than an opening area of the second opening of the reaction passage.

8. The microreactor according to claim 1, wherein a flowing direction of the heat medium in the medium passage and a flowing direction of the fluid in the reaction passage are opposed to each other.

* * * * *